Oct. 4, 1949.  W. F. WOLFNER, II  2,483,450
ELECTRIC DETECTION APPARATUS
Original Filed May 19, 1941
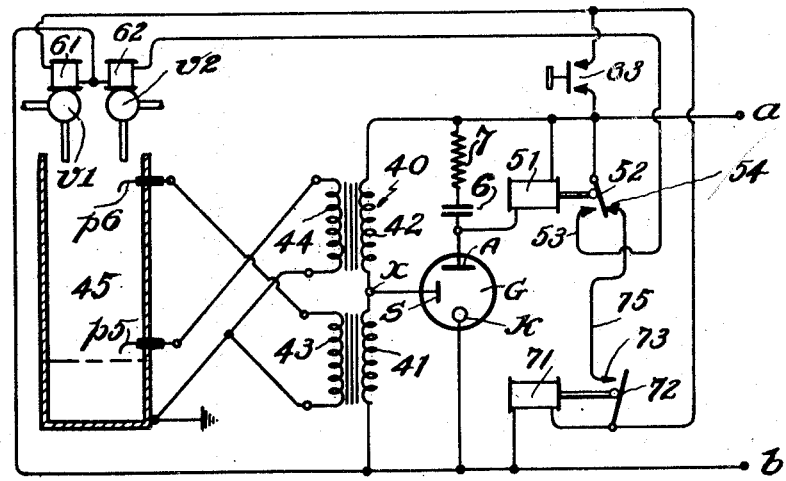
Inventor
William F. Wolfner, II
by [signature]
his Atty.

Patented Oct. 4, 1949

2,483,450

UNITED STATES PATENT OFFICE 2,483,450

ELECTRIC DETECTION APPARATUS

William F. Wolfner, II, Asbury Park, N. J., assignor to Photoswitch Incorporated, Cambridge, Mass., a corporation of Massachusetts Original application May 19, 1941, Serial No. 394,231. Divided and this application October 3, 1944, Serial No. 557,033

3 Claims. (Cl. 137—68)

This invention relates to electric apparatus of a type which is especially suited for detecting operating conditions of industrial installations and translating such conditions into a change of conductivity of a controlled circuit, which change is then utilized for indicating or signaling the detected condition or for automatically initiating appropriate control operations. The present application is a division of application Serial No. 394,231, filed May 19, 1941.

Some of the objects of the invention are to provide such an arrangement which is simple and rugged, has a minimum of moving contacts, is versatile so that it can easily be adapted to various operating conditions, and lends itself to use with electronic discharge devices including especially the so-called cold cathode tubes which consume a minimum of current; to provide a circuit of that nature which can be completely isolated from the supply line without providing special instrumentalities for that purpose; and to provide a circuit of this type which inherently limits detecting or probe currents to predetermined values and requires only a low voltage in detecting or probe circuit.

In accordance with the invention, a potential apportioning device, as for example a reactive impedance, or ohmic capacitive or reactive impedances in series are connected to a source of alternating intermittent or otherwise reactively effective current, and a detecting circuit is inductively coupled with the apportioning impedance, as by a secondary winding in the magnetic circuit of that impedance. Variations in the reactive relation of apportioning impedance and detecting circuit vary the distribution of potential over that impedance, and such variations are derived therefrom for control purposes in response to impedance changes in the detecting circuit due to changes of the condition to be supervised. Such detecting resistance changes may be derived from the opening or closing of the normally closed or open, respectively, detecting circuit. For utilizing the change of potential distribution, it is applied to a sensitive control element, preferably by connecting the apportioning impedance or an impedance coupled thereto to the control grid of an electron discharge tube, for varying the conductivity of its anode circuit and in this manner operating appropriate control apparatus.

Arrangements of this type were found especially useful for example in liquid level control systems where the detecting circuit includes probes and is affected by connection, or disconnection, of the probes by the liquid or changes in properties of the liquid therebetween; the consequent inductive relation between detecting circuit and apportioning impedance affects the control electrode of an electronic device, changes the conductivity of that device and in this manner operates apparatus which supervises or controls the supply or discharge of the liquid.

These and other objects and aspects of my invention will be apparent from the following description of a practical embodiment thereof by way of example; this description refers to a drawing showing a diagram of this embodiment.

This embodiment is by way of example applied to a mixing arrangement controlling two liquid supply valves $v1$ and $v2$ for the discharge into a tank or other container 45 of predetermined amounts of different liquids. In this drawing, terminals $a$ and $b$ represent an alternating current source, 40 a potential apportioning impedance with two primary portions 41, 42 and two secondary portions 43, 44, and G an electron discharge device which may include a high vacuum tube or a glow discharge tube with anode A, cathode K and control electrode $s$. Secondary 44 is connected between a low level probe such as ground and an intermediate level probe $p5$ of tank 45, and secondary 43 between ground and high level probe $p6$.

Tube G, when conductive, energizes a relay magnet 51, bridged by current-smoothing capacitor 6 and limiting resistor 7, whose changeover switch element 52 then connects source terminal $a$ with contact 53 whereas 52 makes connection at 54 when the magnet is deenergized.

An actuating circuit includes operating means such as actuating elements 61, 62 of valves $v1$ and $v2$. One side of each element is connected to source terminal $b$ whereas the other side of element 62 is connected to contact 53 and the other side of element 61 through push button switch 63 to terminal $a$. A holding circuit includes holding magnet 71 with holding switch 72 and contact 73, this magnet being connected in series with push button initiating switch 63 between source terminals $a$, $b$. A wire 75 connects contacts 54 and 73.

Assuming tank 45 to be empty, control impedances 41 and 42 will apportion the potential difference between $a$, $b$ in such manner that the potential at $x$ is below the starting value and hence magnet 51 is deenergized. When push button 63 is pressed, an initiating operating circuit $a$—63—61—$b$ and a holding circuit a—63—71—b are established. Magnet 71 will close switch 72, 73 and thus connect itself to the supply through a—52—54—73—72—71—b, so that the push button connection is replaced by the holding connection a—52—54—75—73—72—61—b. Valve v1 will be opened by 61 and discharge liquid into the tank.

When the liquid level reaches probe p5, the outer resistance of secondary 44 is decreased by this change of the detecting impedance between ground and p5, the control impedance of 44 drops and the potential level of $x$ rises above the starting value. Tube G becomes conducting and energizes magnet 51 which shifts switch 52 from contact 54 to contact 53, deenergizing magnet 71 and opening switch 72, 73, and hence interrupting the energizing circuit of valve 61 which will thereupon close its supply line. At the same time, a completing circuit a—52—53—62—b is closed which energizes magnet 62 causing valve v2 to discharge its liquid into the tank.

When the liquid level reaches probe p6, the potential drop across 41 decreases because the outer resistance of 43 decreases, the potential at $x$ falls below the starting value, magnet 51 is deenergized, the energizing circuit of valve 62 interrupted at 53, and the entire circuit restored to normal condition.

The tank can now be emptied and, merely by pressing button 63, again filled with a mixture whose proportions are determined by the positions of probes p5, p6. It will be understood that this proportion can be varied by shifting the probes which may be constituted by the exposed tips of otherwise well-insulated conductor rods immersed to adjustable depths through the top of the tank.

It will now be evident that my invention permits a very simple solution of a control, detecting and measuring problem, through shifting the inductance and hence potential distribution along a potential apportioning impedance which is magnetically coupled with a control or detecting impedance whose variations react upon the apportioning impedance shifting the potential level of a point of the latter which is connected to a device sensitive to such potential changes, as for example, the control electrode of an electronic discharge device.

It should be understood that the present disclosure is for the purpose of illustration only and that this invention includes all modifications and equivalents which fall within the scope of the appended claims.

I claim:

1. Electric relay apparatus comprising a source of alternating current; an electron discharge device having anode, cathode and control electrode; an output circuit supplied from said source and including said anode, said cathode and a relay magnet controlling a change-over switch which, with said output circuit energized, establishes a circuit connection; two transformers having primaries connected in series; connections from the terminals joining said primaries to said electrode, from the other terminal of the first primary to the anode supplying terminal of said source, and from the other terminal of the second primary to the cathode supplying terminal of said source; a first detecting electrode connected to one terminal of each transformer secondary, a second detecting electrode connected to the other terminal of one secondary, and a third detecting electrode connected to the other terminal of the other secondary; variable detecting impedances connected between said first, and said second and third detecting electrodes, respectively; an initiating circuit including first operating means adapted to cause variation of said first impedance and in series to said first operating means a normally open initiating switch; and a completing circuit including a second operating means connected through said circuit connection to said source; whereby closing of said initiating switch energizes said first operating means, variation of said first impedance energizes said relay magnet establishing said circuit connection thereby starting said second operating means, and variation of said second impedance breaks said connection thereby stopping said second operating means and returning the apparatus to normal condition.

2. Electric relay apparatus comprising a source of alternating current; an electron discharge device having anode, cathode and control electrode; an output circuit supplied from said source and including said anode, said cathode and a relay magnet controlling a change-over switch which, with said output circuit deenergized, establishes connection to a first contact and upon energization shifts connection to a second contact; two control impedances connected in series; connections from the terminals joining said impedances to said electrode, from the other terminal of the first impedance to the anode-supplying terminal of said source, and from the other terminal of the second impedance to the cathode-supplying terminal of said source; a vessel conductively connected at its lowest level to one terminal of each control impedance, an intermediate level probe in said vessel and connected to the other terminal of one impedance, and a high-level probe in said vessel and connected to the other terminal of the other impedance; an initiating circuit including first operating means adapted to cause delivery of material to said vessel, in parallel thereto a holding magnet adapted upon energization to close a normally open holding switch, and in series to said operating means and said holding magnet a normally open initiating switch; a holding circuit including a connection from said operating means and said holding magnet through said holding switch and said first contact of said change-over switch to said source; and a completing circuit including a second operating means connected between said source and said second contact; whereby closing of said initiating switch energizes said first operating means and said holding magnet, a change of said first control impedance energizes said relay magnet and causes said shift of connection thereby stopping said first and starting said second operating means, and a change of said second control impedance again shifts said connection thereby stopping said second operating means and returning the apparatus to normal condition.

3. Electric relay apparatus comprising a source of alternating current; an electron discharge device having anode, cathode and control electrode; an output circuit supplied from said source and including said anode, said cathode and a relay magnet controlling a change-over switch which, with said output circuit deenergized, establishes connection to a first contact and upon energization shifts connection to a second contact; two transformers having primaries connected in series; connections from the terminals joining said primaries to said electrode, from the other terminal of the first primary to the anode supplying terminal of said source, and from the other terminal of the second primary to the cathode-supplying terminal of said source; a vessel conductively connected at its lowest level to one terminal of each transformer secondary, an intermediate level probe in said vessel and connected to the other terminal of the first secondary, and a high-level probe in said vessel and connected to the other terminal of the second secondary; an initiating circuit including first operating means adapted to cause delivery of material to said vessel, in parallel thereto a holding magnet adapted upon energization to close a normally open holding switch, and a series to said operating means and said holding magnet a normally open initiating switch; a holding circuit including a connection from said operating means and said holding magnet through said holding switch and said first contact of said change-over switch to said source; and a completing circuit including a second operating means connected between said source and said second contact; whereby closing of said initiating switch energizes said first operating means and said holding magnet, bridging of said first secondary by said material between said vessel and said intermediate level probe energizes said relay magnet and causes said shift of connection thereby stopping said first and starting said second operating means, and bridging of said second secondary by material reaching said high level probe again shifts said connection thereby stopping said second operating means and returning the apparatus to normal condition.

WILLIAM F. WOLFNER, II.

REFERENCES CITED

The following references are of record in the file of this patent:

UNITED STATES PATENTS

| Number | Name | Date |
|---|---|---|
| 2,011,381 | Suits | Aug. 13, 1935 |
| 2,112,682 | Ryder | Mar. 29, 1938 |
| 2,230,693 | Mills | Feb. 4, 1941 |
| 2,261,495 | Ewertz | Nov. 4, 1941 |
| 2,349,849 | Deal | May 30, 1944 |
| 2,352,240 | Wolfner | June 27, 1944 |
| 2,358,432 | Wolfner, 2nd | Sept. 19, 1944 |
| 2,358,433 | Wolfner, 2nd | Sept. 19, 1944 |